Aug. 16, 1938.     E. W. MILLER     2,126,907
MACHINE FOR SHAPING HELICOIDAL SURFACES
Filed March 9, 1935     3 Sheets-Sheet 1
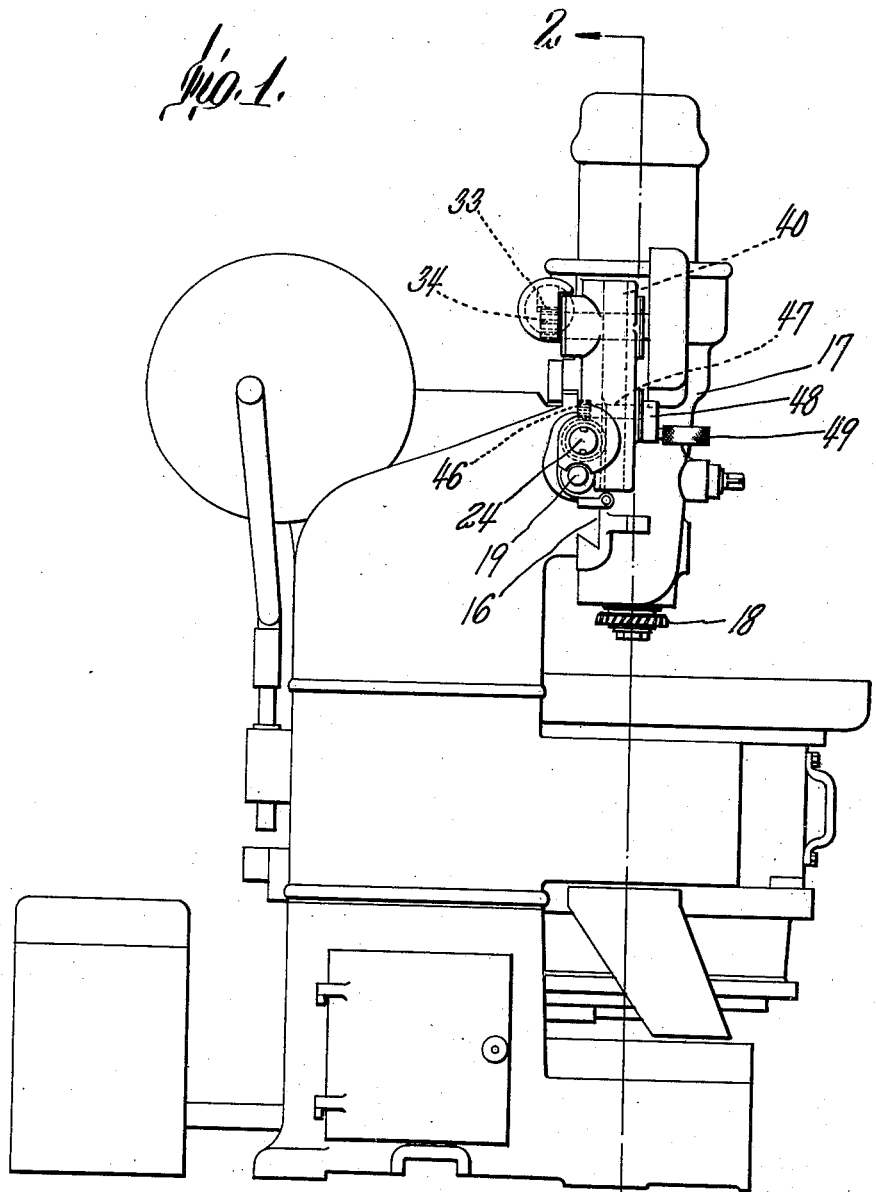

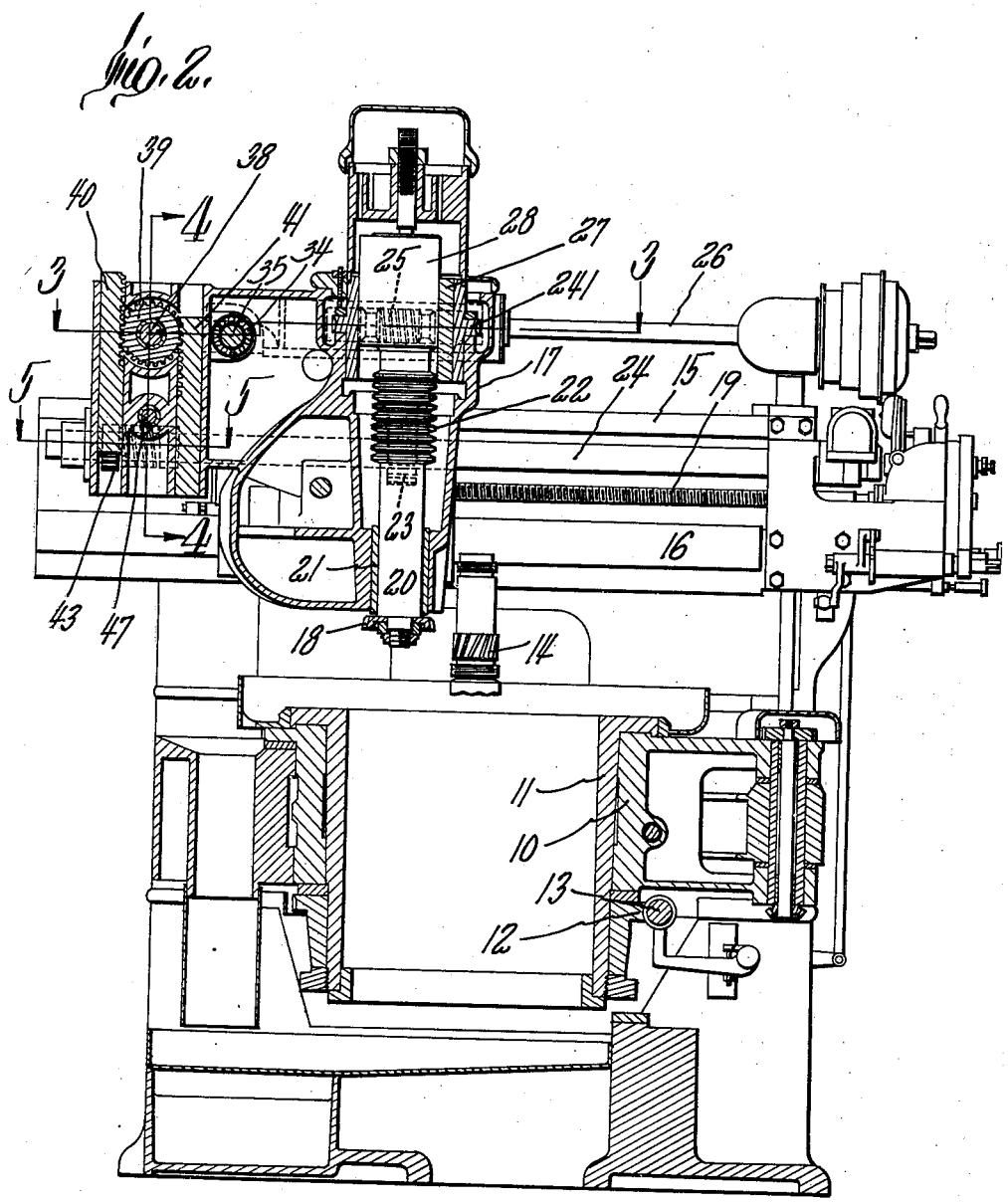

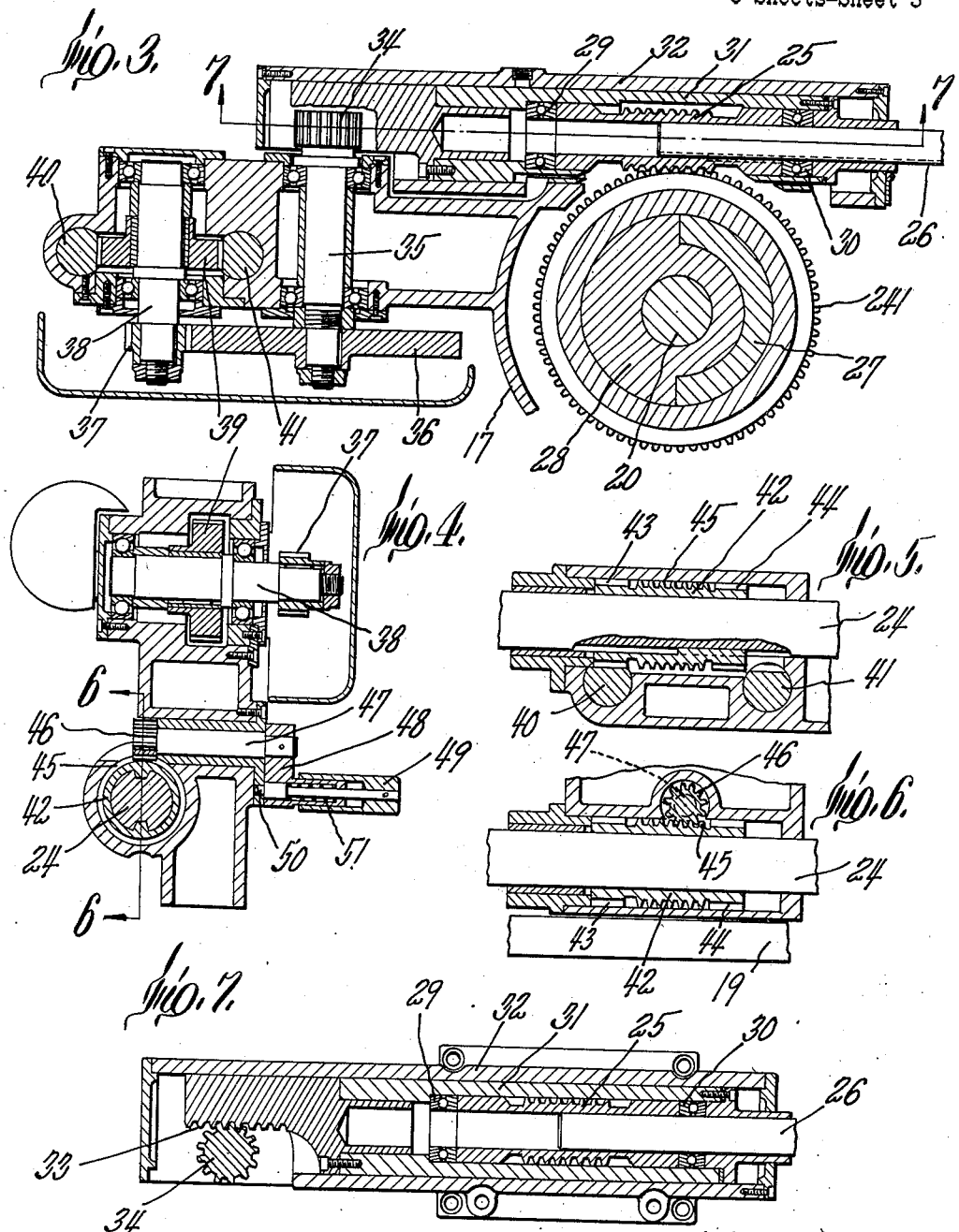

Patented Aug. 16, 1938

2,126,907

UNITED STATES PATENT OFFICE 2,126,907

MACHINE FOR SHAPING HELICOIDAL SURFACES

Edward W. Miller, Springfield, Vt., assignor to The Fellows Gear Shaper Company, Springfield, Vt., a corporation of Vermont Application March 9, 1935, Serial No. 10,198

14 Claims. (Cl. 90—9)

This invention is concerned with machine tools of the type in which a planing action is performed by linear traverse of a cutting tool across the surface of a work piece, or vice versa. More particularly, it is concerned with machines of this type which perform a generating as well as a cutting action, and produce helicoidal surfaces in the work by rotating the cutter and work piece simultaneously and giving to the reciprocating member back and forth oscillatory movements simultaneously with its reciprocating movement such that points on its periphery are caused to travel in helical paths.

Machines of this type have been developed heretofore for generating gears and analogous machine elements both external and internal, for cutting external and internal toothed clutch elements, forming splines, keys, keyways, etc. Such a machine is shown, for example, in the patent of Edwin R. Fellows No. 676,227, dated June 11, 1901. The embodiment of the invention herein illustrated is in fact based on the principles and contains many of the structural characteristics and details of the machine disclosed in said patent. However, the new steps and characteristics of the invention are not limited to use in combination with that specific machine, but are applicable to a variety of other situations in which are found a reciprocative and rotatable cutter spindle or work spindle, together with means for imparting reciprocative and rotative movements to such spindle.

The object of this invention is primarily to provide an improved means for imposing the rotary component of helical motion to such a reciprocating spindle, with the elimination of the helical guides heretofore generally used for that purpose, by which the direction of such rotary component may be reversed at will and easily, so as to cut helices of either right or left hand; and with respect to which the helix angle of the paths traversed by projections or surfaces carried by the spindle is not limited within the effective or efficient degree of non-reciprocating helical reaction guides.

The invention consists generically in means effective to carry out the objects above mentioned, and specifically in the combination with a rock shaft organized to reciprocate the spindle, of mechanism driven by such rock shaft, and acting through a gear element connected with the spindle to impart rotation to the spindle. It includes further shiftable means for reversing the direction of rotation transmitted to such gear element by rotary motion of the rock shaft in a given direction. An embodiment of the invention is explained in detail in the following specification and illustrated in the drawings provided herewith. In these drawings—

Figure 1 is a side elevation of the machine referred to;

Fig. 2 is a vertical longitudinal section of the machine taken on line 2—2 of Fig. 1;

Fig. 3 is a horizontal section taken on line 3—3 of Fig. 2;

Fig. 4 is a partial vertical section taken on line 4—4 of Fig. 2;

Fig. 5 is a fragmentary horizontal section taken on line 5—5 of Fig. 2;

Fig. 6 is a fragmentary vertical section taken on line 6—6 of Fig. 4;

Fig. 7 is a vertical section taken on line 7—7 of Fig. 3.

Like reference characters designate the same parts wherever they occur in all the figures.

The frame of the machine contains in its lower or base part a bearing 10, in which is mounted rotatably a tubular work spindle 11, carrying externally a worm gear 12 in mesh with a worm 13, by which it is rotated. This spindle is adapted to contain holders, chucks or arbors of various types, on or in which a work piece, such as 14, may be secured. The upper part of the machine frame is provided with horizontal guideways 15 and 16, on which the cutter carriage or saddle 17 is mounted, with capability for movement so as to bring the cutter 18 up to the work, and withdraw it. 19 represents a feed screw, by which the cutter saddle is so moved.

The cutter is secured to the lower end of a spindle 20, which is mounted to rotate and reciprocate in a bearing 21, in the saddle 17, and protrudes therefrom at its lower end. The spindle is provided with encircling rack teeth 22, with which meshes a gear or gear segment 23, carried by a rock shaft 24. Oscillation of the rock shaft reciprocates the cutter spindle to traverse the cutter endwise back and forth and therefore across that part of the work in which cuts are to be made. Rotation is imparted to the cutter spindle by a surrounding gear wheel or worm gear 241, which is driven by an intermeshing worm 25 on a shaft 26, and transmits rotation to the spindle through guide members 27 and 28, of which the former is secured to the gear and the other to the spindle. These guide members have abutting surfaces which extend lengthwise of the spindle and permit unrestricted endwise movements of the latter while preventing any relative rotation between the spindle and the gear.

As thus far described, the machine here shown does not differ substantially from that shown in the beforementioned patent, to which reference is directed for explanation of the driving means, the means for correlating the rotation of the work spindle driving worm 13 with that of the cutter spindle driving worm 25, means for feeding and backing off the cutter, and other details not shown herein.

The new steps of the present invention are embodied in mechanism by which the rock shaft 24 imparts angular movement to the gear wheel 241, in correlation with the reciprocating movements of the spindle 20, and independently of the movement caused by rotation of the worm 25. Such mechanism as shown herein comprises the following parts:—

The worm 25 is splined to the shaft 26, and is confined between positive (unyielding) end thrust bearings 29, 30, at both ends in a slide 31, which is confined and movable endwise (that is, lengthwise of the shaft 26) in a housing or guide 32, which is secured to the rear side of the cutter carriage 17. Slide 31 carries at one end a rack element 33 in mesh with a pinion 34.

This pinion is carried by a shaft 35, rotatably mounted in an extension of the cutter saddle, which shaft carries also a gear 36 in mesh with a pinion 37 on a shaft 38, mounted on the cutter saddle extension beside shaft 35. A gear 39, secured to shaft 38, is in mesh with two rack bars 40 and 41 at respectively opposite sides of its circumference, which are movable endwise in vertical guideways in the cutter saddle extension. The lower ends of the two rack bars are provided with rack teeth on the rear side (as shown in this illustration), that is, on relatively the same side of both. A sleeve 42 is splined on the shaft 24, so as to be slidable endwise thereon; and it carries two pinion elements 43 and 44, one at each of its opposite ends, which are separated from one another by a distance less than that between the rack bars 40 and 41. By moving the sleeve 42 endwise in one direction or the other, gear element 43 may be put in mesh with the teeth at the lower rear side of rack bar 40, as shown in the drawings, or the gear element 44 may be brought into mesh with the corresponding teeth on rack bar 41. When the sleeve is thus in geared connection with either rack bar, it is completely disengaged from the other rack bar.

The sleeve 42 is provided between its end with a series of encircling rack teeth 45. These teeth are engaged with a shift pinion 46 on a rock shaft 47, to which is secured a crank arm 48, having a handle 49 and a locking pin 50. By turning the crank handle in one direction or the other, the sleeve may be shifted so as to engage it with either of the rack bars 40 or 41 exclusively. Locking pin 50 travels over the exposed outer surface of the cutter saddle extension, and is adapted to enter either one of two holes in such surface suitably located to secure the handle, and correspondingly the sleeve 42, in either of the extreme positions described. The locking pin is so connected to handle 49, that it may be withdrawn from the retaining holes by pulling outward on the handle. A spring 51 presses the pin to advance it automatically into either retaining hole, when brought in register with the hole.

It will be readily apparent from the foregoing description that, when sleeve 45 is in the position here shown, the rock shaft 24 is coupled (by means of this sleeve and its pinion 43, rack bar 40, gear train 39, 37, 36, 34 and rack 33) with the worm 25, so as to move the latter endwise whenever the rock shaft is turned. In being so moved, worm 25 acts in the manner of a rack on gear 241 so as to turn the latter, and thereby the cutter spindle, at a rate which is definitely and exactly correlated with the rate of axial movement of the spindle. Such endwise movements of the worm 25 occur only when the spindle moves endwise. They cease and reverse with each pause and reversal of the spindle, and their rates of speed and acceleration are equal to those of the spindle. The rotation thus imparted to the spindled is compounded with the longitudinal movement of the spindle to cause the paths of the cutter teeth to be true helices of uniform lead.

Gears 37 and 36 are change gears, for which others of different ratio may be substituted. By making such substitution, the angular component of the helical motion described can be made of any value desired, large or small. An important and valuable result following from this capacity for adjustment is that the cutter teeth paths may be given a much larger helix angle, or, in other words, a much shorter lead than can be done with helical guides of the type shown (alternatively to the straight guides) in the said Fellows patent.

When the sleeve 42 is shifted so as to couple rack bar 41 with the rock shaft, the direction in which the spindle is rotated, while moving in a given direction (downward, for instance), is reversed. Hence, by turning the shaft control handle 49 to one side or the other, the machine can be instantly and easily converted from condition to cut a right hand helix to condition for cutting a left hand helix, and vice versa. Owing to the positive, i. e., unyielding, end thrust engagement between the worm 25 and slide 31, and the positive gearing between the slide and both rack bars, the movement imparted to the worm, when it acts as a rack to give the angular component of helical motion to the cutter spindle, is positive in both directions. This is important because it not only causes the withdrawal path of the spindle to be accurately controlled, but also because it enables either right hand or left hand helical gears to be cut without possibility of the cutter teeth deviating from the prescribed helical path, which would be possible if one of the end thrust bearings for the worm were a spring or other yieldable means.

The foregoing description of the cooperating guide surfaces between the spindle and indexing gear is not to be construed as excluding the possibility of using helical guides in this situation, if for any reason it is desired to combine helical guides wth the new means for turning the spindle back and forth. While, as hereinbefore stated, the new spindle oscillating means enables all of the results to be obtained which have previously been accomplished by helical guides, and other results not obtainable with such guides as heretofore employed, it is obvious that no obstacle exists to the combination of such helical guides with the new mechanism. Hence the claims are to be construed in accordance with this explanation.

While I have herein described the invention as applied to a gear generating machine of the type in which cutters with teeth similar to gear teeth are used, and the cutter spindle is the one to which helical movement is imparted, I wish to make it clear that the principles of the invention and the generic claims are not necessarily so limited. For instance, these principles may be applied for helically advancing and retracting a work holding shaft or its equivalent to carry a work piece past a stationary tool; such, for instance, as the work spindle shown in my Patent 2,069,323, granted February 2, 1937.

What I claim and desire to secure by Letters Patent is:—

1. In a machine for shaping helicoidal surfaces having a rotatable and endwise movable spindle and a gear wheel for rotating said spindle, an endwise movable rack element in mesh with said gear wheel, means for reciprocating said spindle, and associated means for advancing and withdrawing said rack element progressively and simultaneously with the advancing and return strokes of the spindle, respectively, said means including shiftable connections for reversing the directions of movement of the rack element relatively to the directions of movement of the spindle.

2. A shaping machine for cutting helicoidal surfaces comprising a rotatable and endwise movable spindle, a rock shaft in geared connection with said spindle for reciprocating it by oscillation of the shaft, a gear having a splined engagement with the spindle for imparting rotation to, while permitting relative reciprocation of, the spindle, a worm meshing with said gear, a shaft with which said worm has a splined engagement, and transmission mechanism between said rock shaft and said worm including a connection with the worm positive in both directions of transmission for moving the latter back and forth endwise simultaneously with each back and forth angular movement of the rock shaft.

3. A shaping machine for cutting helicoidal surfaces comprising a rotatable and endwise movable spindle, a rock shaft in geared connection with said spindle for reciprocating it by oscillation of the shaft, a gear having a splined engagement with the spindle for imparting rotation to, while permitting relative reciprocation of, the spindle, a worm meshing with said gear, a shaft with which said worm has a splined engagement, and transmission mechanism between said rock shaft and said worm including a connection with the worm positive in both directions of transmission for moving the latter endwise in one direction during each movement of the rock shaft in right hand rotation, and in the opposite direction during each movement of the rock shaft in left hand rotation; said transmission mechanism including changeable gears to permit variations in the speed of endwise movement of the worm relatively to the speed of endwise movements of the spindle.

4. A shaping machine for cutting helicoidal surfaces comprising a rotatable and endwise movable spindle, a rock shaft in geared connection with said spindle for reciprocating it by oscillation of the shaft, a gear having a splined engagement with the spindle for imparting rotation to, while permitting relative reciprocation of, the spindle, a worm meshing with said gear, a shaft with which said worm has a splined engagement, and transmission mechanism between said rock shaft and said worm for moving the latter in one direction endwise while the rock shaft turns in one direction of rotation, and in the opposite direction endwise throughout each reverse angular movement of the rock shaft, said transmission mechanism including shiftable gearing for reversing the directions of endwise movement of the worm with respect to given angular movements of the rock shaft.

5. In a machine tool, an endwise movable and rotatable spindle having rack teeth, a rock shaft, a gear element mounted on said rock shaft engaging said rack teeth for reciprocating the spindle when the shaft is rocked in opposite directions, a gear element on the rock shaft, a rack bar meshing with said element to be reciprocated endwise thereby, a second gear in mesh with said rack bar, and gearing between said last named gear element and the spindle for turning the spindle angularly back and forth as the gear element is turned back and forth.

6. In a machine tool, an endwise movable and rotatable spindle having rack teeth, a rock shaft, a gear element mounted on said rock shaft engaging said rack teeth for reciprocating the spindle when the shaft is rocked in opposite directions, a gear element splined to the rock shaft, two rack bars mounted to travel in parallel paths and arranged for exclusive intermeshing engagement with said gear element in consequence of shifting of the latter on the rock shaft, a gear element mounted between said rack bars in mesh with both, and means operated by the last gear element for turning the spindle back and forth simultaneously with back and forth angular movements of the last named gear.

7. In a gear shaping machine, a rotatable and endwise movable spindle having rack teeth, a gear surrounding said spindle in splined engagement therewith, a rock shaft having a pinion in mesh with the rack teeth of the spindle for rotating the latter, a worm in mesh with the spindle rotating gear wheel, a shaft splined to said worm for rotating it and with respect to which the worm is movable endwise, a rack element coupled with said worm for moving it endwise, a pinion in mesh with said rack element, and means operated by said rock shaft for turning said pinion back and forth in correlation with the opposite angular movements of the rock shaft.

8. In a gear shaping machine, a rotatable and endwise movable spindle having rack teeth, a gear surrounding said spindle in splined engagement therewith, a rock shaft having a pinion in mesh with the rack teeth of the spindle for reciprocating the latter, a worm in mesh with the spindle rotating gear wheel, a shaft splined to said worm for rotating it and with respect to which the worm is movable endwise, a rack element coupled with said worm for moving it endwise, a pinion in mesh with said rack element, a gear element in driving connection with said pinion, rack bars in mesh with said gear element at opposite sides of the axis thereof, a gear element splined to said rock shaft at the same side of both rack bars, adapted to be shifted into exclusive mesh alternately with each, and means for so shifting said last named gear element.

9. In a machine for shaping helicoidal surfaces having a rotatable and endwise movable spindle and a gear wheel in splined connection with said spindle for rotating it, an axially displaceable driving worm in mesh with said gear wheel, means for rotating said worm progressively in one direction, and mechanism positively coupled with said spindle and worm for imparting motion endwise to both simultaneously and in alternately opposite directions, organized to advance and retract the spindle with a helical or twisting motion.

10. In a machine for shaping helicoidal surfaces, a rotatable and endwise movable spindle, a gear wheel in splined connection with said spindle, an endwise movable rack element in mesh with said gear wheel, driving connections with said rack element organized to move it positively lengthwise in opposite directions, and associated means for reciprocating the spindle and actuating said driving connections simultaneously, whereby the spindle is turned in one direction of rotation throughout its endwise advance movement, and in the opposite direction of rotation throughout its endwise retracting movement.

11. In a machine for shaping helicoidal surfaces, a rotatable and endwise movable spindle, a gear wheel in splined connection with the spindle for rotating it, a rotatable and endwise movable worm in mesh with said gear wheel, means for rotating said worm to give generating rotation to the spindle, means for reciprocating the spindle endwise, a slide movable back and forth lengthwise of the worm and to which the worm is coupled to move with it, and positive gearing driven by said spindle-reciprocating means and coupled with said slide to move the latter in one direction progressively with the advancing endwise movements of the spindle and in the opposite direction progressively with the withdrawing endwise movements of the spindle.

12. In a machine for shaping helicoidal surfaces, a rotatable and endwise movable spindle, a gear wheel in splined connection with the spindle for rotating it, a rotatable and endwise movable worm in mesh with said gear wheel, means for rotating said worm to give generating rotation to the spindle, means for reciprocating the spindle endwise, a slide movable back and forth lengthwise of the worm and to which the worm is coupled to move with it, said slide having a rack, a pinion in mesh with said rack, and transmission gearing between said pinion and the spindle-reciprocating means organized to turn the pinion in one direction while the spindle is advanced endwise, and to turn the pinion in the opposite direction while the spindle is retracted.

13. In a machne for shaping helicoidal surfaces, a rotatable and endwise movable spindle, a gear wheel in splined connection with the spindle for rotating it, a rotatable and endwise movable worm in mesh with said gear wheel, means for rotating said worm to give generating rotation to the spindle, means for reciprocating the spindle endwise, a slide movable back and forth lengthwise of the worm and to which the worm is coupled to move with it, a rock shaft having a geared connection with the spindle to move the latter back and forth endwise with opposite angular movements of the shaft, a pinion geared to said shaft to turn back and forth in time with it, and a rack carried by said slide in mesh with said pinion to be reciprocated thereby and to transmit the before-mentioned back and forth movement to the slide.

14. In a machine for cutting helicoidal surfaces, a rotatable and endwise movable spindle, means for reciprocating said spindle endwise, reversible rotation-imparting means correlated with the spindle-reciprocating means operable to give either clockwise or counter-clockwise rotation, according to its condition, to the spindle during forward endwise travel of the spindle, and means forming a part of the organized machine for reversing the driving condition of the rotation-transmitting means.

EDWARD W. MILLER.